US007006437B2

(12) United States Patent
Ogier et al.

(10) Patent No.: US 7,006,437 B2
(45) Date of Patent: Feb. 28, 2006

(54) SCHEDULING MECHANISMS FOR USE IN MOBILE AD HOC WIRELESS NETWORKS FOR ACHIEVING A DIFFERENTIATED SERVICES PER-HOP BEHAVIOR

(75) Inventors: Richard G. Ogier, Half Moon Bay, CA (US); Ambatipudi R. Sastry, Fremont, CA (US)

(73) Assignee: SRI International, Menlo Park, CA (US)

( * ) Notice: Subject to any disclaimer, the term of this patent is extended or adjusted under 35 U.S.C. 154(b) by 885 days.

(21) Appl. No.: 09/900,631

(22) Filed: Jul. 6, 2001

(65) Prior Publication Data

US 2003/0007453 A1   Jan. 9, 2003

(51) Int. Cl.
    *G01R 31/08* (2006.01)
(52) U.S. Cl. .................................................. 370/230.1
(58) Field of Classification Search ..... 370/229–236.1, 370/252, 412, 401, 468
    See application file for complete search history.

(56) References Cited

U.S. PATENT DOCUMENTS

| 5,581,544 | A | 12/1996 | Hamada et al. ............. 370/253 |
| 5,754,658 | A | 5/1998 | Aucsmith ..................... 380/28 |
| 5,886,993 | A | 3/1999 | Ruszczyk et al. ........... 370/451 |
| 6,028,857 | A | 2/2000 | Poor ........................... 370/351 |
| 6,047,322 | A | 4/2000 | Vaid et al. ................... 709/224 |
| 6,097,703 | A | 8/2000 | Larsen et al. ................ 370/254 |
| 6,105,027 | A | 8/2000 | Schneider et al. ............. 707/9 |
| 6,157,614 | A | 12/2000 | Pasternak et al. ........... 370/236 |
| 6,163,808 | A | 12/2000 | Kilkki ........................ 709/233 |
| 6,163,843 | A | 12/2000 | Inoue et al. ................. 713/201 |
| 6,167,445 | A | 12/2000 | Gai et al. .................... 709/223 |
| 6,170,057 | B1 | 1/2001 | Inoue et al. ................. 713/153 |
| 6,178,505 | B1 | 1/2001 | Schneider et al. ............. 713/18 |
| 6,201,871 | B1 | 3/2001 | Bostley, III et al. ......... 380/249 |
| 6,204,797 | B1 | 3/2001 | Wicks et al. ................... 342/13 |
| 6,470,016 | B1 * | 10/2002 | Kalkunte et al. ...... 370/395.41 |
| 6,646,988 | B1 * | 11/2003 | Nandy et al. ................ 370/235 |
| 6,657,960 | B1 * | 12/2003 | Jeffries et al. ............ 370/230.1 |
| 6,748,435 | B1 * | 6/2004 | Wang et al. ................. 709/225 |
| 6,775,231 | B1 * | 8/2004 | Baker et al. ............. 370/230.1 |

(Continued)

FOREIGN PATENT DOCUMENTS

WO    WO 00/13436    3/2000

OTHER PUBLICATIONS

"A revised expression of the Expedited Forwarding PHB" Internet—Draft http://search.ietf.org/internet-drafts/draft-ietf-diffserv-efresolve-00.txt printed Apr. 18, 2001 (7 pages).

(Continued)

*Primary Examiner*—Dang Ton
*Assistant Examiner*—Puneet Bhandari
(74) *Attorney, Agent, or Firm*—Kin-Wah Tong, Esq.; Patterson & Sheridan, LLP

(57) ABSTRACT

Scheduling mechanisms for attaining a per-hop behavior for a plurality of classes of packet traffic in a multi-hop network are described. The per-hop behavior allocates to each class a nominal departure rate and a minimum percentage of available bandwidth. The scheduling mechanisms define a first condition that affects packet forwarding in accordance with the nominal departure rates allocated to the classes and a second condition that affects packet forwarding in accordance with the minimum percentages of the available bandwidth allocated to the classes. Packet forwarding rates for each of the classes are compared with the first and second conditions to select one of the classes for forwarding packets of that class over the network.

20 Claims, 4 Drawing Sheets

U.S. PATENT DOCUMENTS 6,775,280 B1 * 8/2004 Ma et al. .................. 370/392
6,839,327 B1 * 1/2005 Zavalkovsky et al. ...... 370/252

OTHER PUBLICATIONS

"An Architecture for Differentiated Services" Network Working Group http://www.ietf.org/rfc/rfc2475.txt printed Jun. 7, 2001 (26 pages).

"An Assured Rate Per-Domain Behavior for Differentiated Services" Internet Draft http://search.ietf.org/internet-drafts/draft-seddigh-pdb-ar-00.txt printed Apr. 18, 2001 (6 pages).

"An Expedited Forwarding PHB" Network Working Group http://www.ietf.org/rfc/rfc2598.txt?number=.2598 printed Apr. 18, 2001 (8 pages).

"Assured Forwarding PHB Group" Network Working Group http://www.ietf.org/rfc/rfc2597.txt?number=2597 printed Apr. 18, 2001 (8 pages).

"Congestion Control in Computer Networks: Issues And Trends" Raj Jain, Digital Equipment Corp., pp. 1-11, IEEE Network Magazine, May 1990, pp. 24-30.

"Current Directions in the DiffServ World" Nicolas Christin, Department of Computer Science, University of Virginia, MNG Meeting, Oct. 3, 2000 (16 pages).

"EF PHB Redefined" Network Working Group, http://search.ietf.org/internet-drafts/draft-charny-ef-definition-01.txt printed Apr. 18, 2001 (22 pages).

IEEE/ACM Transactions On Networks, vol. 1, No. 4, Aug. 1993, "Random Early Detection Gateways for congestion Avoidance" S. Floyd and V. Jacobson.

IEEE Personal Communication, vol. 4, No. 1, Feb. 1997, "Signal Stability-Based Adaptive Routing (SSA) for Ad Hoc Mobile Networks" Rohit Dube, Cynthia D. Rais, Kuang-Yeh Wang, and Satish K. Tripathi, University of Maryland.

IEEE Infocom '98 Proceedings, The Conference on Computer Communications, vol. 2, Seventeenth Annual Joint Conference of the IEEE Computer and Communications Societies, pp. 572-580 "Multimedia Wireless Link Sharing via Enhanced Class-Based Queuing with Channel-State-Dependent Packet Scheduling" Christine Fragouli, Vijay Sivaraman, Mani B. Srivastava, University of California, Los Angeles.

2000 IEEE 51st Vehicular Technology Conference Proceedings, May 15-18, 2000, Tokyo, Japan, pp. 445-449, "A Flexible Quality of Service Model for Mobile Ad-Hoc Networks" Hannan Xiao, Winston K.G. Seah, Anthony Lo, and Kee Chaing Chua.

"IP Authentication Header" Network Working Group http://www.ietf.org/rfc/rfc2402.txt?number=2402 printed Apr. 19, 2001 (16 pages).

"IP Authentication using Keyed MD5" Network Working Group http://www.ietf.org/rfc/rfc1828.txt?number=1828 printed Apr. 19, 2001 (5 pages).

"IP Encapsulating Security Payload" Network Working Group http://www.ietf.org/rfc/rfc2406.txt?number=2406 printed Apr. 19, 2001 (16 pages).

"Per Flow Admission Control over AF PHB Classes" Working Group: Internet Draft http://search.ietf.org/internet-drafts/draft-bianchi-blefari-admcontr-over-af-phb-00.txt printed Apr. 18, 2001 (8 pages).

"Proportional Forwarding PHB" Diffserv Working Group, http://search.ietf.org/internet-drafts/draft-jagannathan-diffserv-pf-00.txt printed Apr. 18, 2001 (10 pages).

"Quality of Service Architectures for Wireless Networks: IntServ and DiffServ Models" Indu Mahadevan and Krishna M. Sivalingam, pp. 420-425.

"Quality of Service in Wireless Networks Based on Differentiated Services Architecture" Indu Mahadevan and Krishna M. sivalingam, pp. 548-553.

"Security Architecture for the Internet Protocol" Network Working Group, http://www.ietf.org/rfc/rfc2401.txt?number=2401 printed Apr. 18, 2001 (47 pages).

"Transmitting Scalable Video over a DiffServ Network" http://www-ise.stanford.edu/class/ee368c/Projects/project06/ printed Jun. 7, 2001 (16 pages).

"Using BGP to distribute flexible QoS information" Internet Engineering Task Force http://search.ietf.org/internet-drafts/draft-bonaventure-bgp-qos-00.txt printed Apr. 18, 2001 (9 pages).

* cited by examiner

SCHEDULING MECHANISMS FOR USE IN MOBILE AD HOC WIRELESS NETWORKS FOR ACHIEVING A DIFFERENTIATED SERVICES PER-HOP BEHAVIOR

GOVERNMENT SUPPORT

This invention was made with government support under Contract No. DAAB07-96-D-H-002, D.O. 212, subcontract S-1548 (SRI Project P10750), awarded by the U.S. Army Communications and Electronics Command. The United States government has certain rights in the invention.

FIELD OF THE INVENTION

The invention relates generally to mobile networks. More specifically, the invention relates scheduling mechanisms for achieving a per-hop behavior for forwarding packets in multi-hop mobile networks.

BACKGROUND

For applications that require quality of service (QoS) assurances, the best effort service model commonly used to transmit information over the Internet is proving inadequate. In general, assuring QoS entails providing differentiated services for certain packet-level or session-level treatment; that is, some users receive higher priority treatment or have a greater bandwidth allocation than other users.

Approaches to managing data traffic for providing differential services fall into two categories, those with network-wide reservations that include explicit signaling and those without such network-wide reservations. Reservation-based traffic management explicitly identifies and reserves network resources. Network nodes categorize data traffic into classes and provide QoS using the network resources reserved for the particular class associated with incoming data traffic. One example of network-wide reservation-based traffic management is the Integrated Services (IntServ) model, which uses the per-flow approach to provide guarantees to individual data streams and makes reservations of resources at intermediate routers.

In traffic management that does not use network-wide reservations, but can use local reservations at a router, the network nodes classify data traffic into a set of classes and use the classes to grant priority-based treatment to the traffic. An example of such traffic management is the Differentiated Services (DiffServ) model. DiffServ provides aggregate assurances for a group of applications.

Today, many of the communication links between the various communications entities in networks are wire-line; that is, client and server systems are typically connected to other server and client systems by wires, such as twisted-pair wires, coaxial cables, fiber optic cables, and the like. Notwithstanding this wired infrastructure, wireless networks such as cellular and Personal Communication Systems (PCS) and wireless local area networks, microwave links, infrared (IR) links, and satellite links are becoming more prevalent. Wireless devices connected to such networks are typically mobile. Such mobility creates frequent, dynamic changes to the network topology. Moreover, the peculiarities of signal propagation over wireless links cause frequent changes to the state of such communication links between the devices on the network. Consequently, nodes in wireless networks need to deal with higher data losses and frequent bandwidth reallocations.

The initial designs of the IntServ and DiffServ models, however, contemplated wired networks only and are not suited for the various characteristics of wireless networks. Thus, there remains a need for a system and a method that can manage traffic in a wireless network to provide QoS assurances despite the aforementioned difficulties associated with the mobility of the communication devices and propagation conditions encountered in the wireless networks.

SUMMARY OF THE INVENTION

An objective of the invention is to provide a scheduling mechanism that achieves a wireless per-hop behavior (PHB) for packet forwarding that is capable of providing quality of service (QoS) assurances in multi-hop mobile ad hoc wireless networks (MANET). Such MANETs comprise a plurality of routing nodes connected by wireless communication links. In wireless networks, router nodes are mobile and propagation conditions between router nodes vary frequently, thereby changing the available bandwidth of the communication links.

In one aspect, the invention features a method for attaining a per-hop behavior for a plurality of classes of packet traffic in a multi-hop network. The per-hop behavior allocates to each class a nominal departure rate and a minimum percentage of available bandwidth. Two conditions are defined. One condition affects packet forwarding in accordance with the nominal departure rates allocated to the classes and a second condition affects packet forwarding in accordance with the minimum percentages of the available bandwidth allocated to the classes. The first condition is whether the packet-forwarding rate of each class is at most the nominal departure rate of that class. The second condition is whether the packet-forwarding rate of a given class is at most the minimum percentage of the available bandwidth of that class. Packet-forwarding rates for each of the classes are compared with the first and second conditions to select one of the classes for forwarding packets of that class over the network.

An average packet-forwarding rate is determined for each class over a time interval having a predetermined duration. In one embodiment, the predetermined duration of the time interval is 5 seconds.

In one embodiment, a scheduling priority is assigned to each class based on a criterion, such as the delay that each class can tolerate. A plurality of the classes from which to select a class for packet forwarding is identified, and the class with the highest scheduling priority is selected from the identified plurality of classes.

In another embodiment, a weight is assigned to each of the classes. The weight assigned to a class corresponds to the minimum percentage of the available bandwidth allocated to that class. A plurality of the classes from which to select a class for packet forwarding is identified. One of the identified classes is selected based on an order determined by the weights assigned to the identified classes. In one embodiment, the order is a weighted round robin order.

In another aspect, the invention features a method for attaining a per-hop behavior for a plurality of classes of packet traffic in a multi-hop network. The per-hop behavior allocates to each class a nominal departure rate and a minimum percentage of available bandwidth. Each class with a non-empty queue that over a time interval is receiving less than the nominal departure rate and less than the minimum percentage of available bandwidth allocated to that class is identified. One of the identified classes is selected according to a predefined criterion for forwarding a packet of the selected class over the network.

In one embodiment, each of the classes is weighted with a weight that corresponds to the minimum percentage of available bandwidth allocated to that class. The predefined criterion is to use a weighted round robin order to select one of the identified classes forwarding a packet of that class over the network.

In another embodiment, a scheduling priority is assigned to each class. In brief overview, the predefined criterion is to select a class with a non-empty queue for forwarding a packet of that class over the network based upon the nominal departure rate and minimum percentage allocations to the classes and upon the assigned scheduling priorities.

For example, when more than one class with a non-empty queue is receiving over a time interval less than the nominal departure rate and less than the rate priority percentage allocated to that class, the scheduling mechanism selects the class with the highest scheduling priority. If each class with a non-empty queue is receiving more than its allocated rate priority percentage of the available bandwidth, the class with the highest scheduling priority of those classes that are receiving at most the respective allocated nominal departure rate is selected. If each class with a non-empty queue is receiving more than the nominal departure rate allocated to that class, the class with the highest scheduling priority of those classes that are receiving at most the respective allocated rate priority percentage of the available bandwidth is selected. If each class with a non-empty queue is receiving more than the nominal departure rate and more than the rate priority percentage allocated to that class, the class with a non-empty queue that has the highest scheduling priority is selected.

In another aspect, the invention features an article of manufacture having computer-readable program means embodied thereon for attaining a per-hop behavior for a plurality of classes of packet traffic in a multi-hop network. The per-hop behavior allocates to each class a nominal departure rate and a minimum percentage of available bandwidth. The article of manufacture includes computer-readable means for defining a first condition that affects packet forwarding in accordance with the nominal departure rates allocated to the classes. The article of manufacture also includes computer-readable means for defining a second condition that affects packet forwarding in accordance with the minimum percentages of the available bandwidth allocated to the classes, and computer-readable means for comparing a packet forwarding rate for each of the classes with the first and second conditions to select one of the classes for forwarding packets of that class over the network.

BRIEF DESCRIPTION OF THE DRAWINGS

The invention is pointed out with particularity in the appended claims. The objectives advantages of the invention described above, as well as further objectives and advantages of the invention, may be better understood by reference to the following description taken in conjunction with the accompanying drawings, in which:

DESCRIPTION OF THE INVENTION

Figure 1:
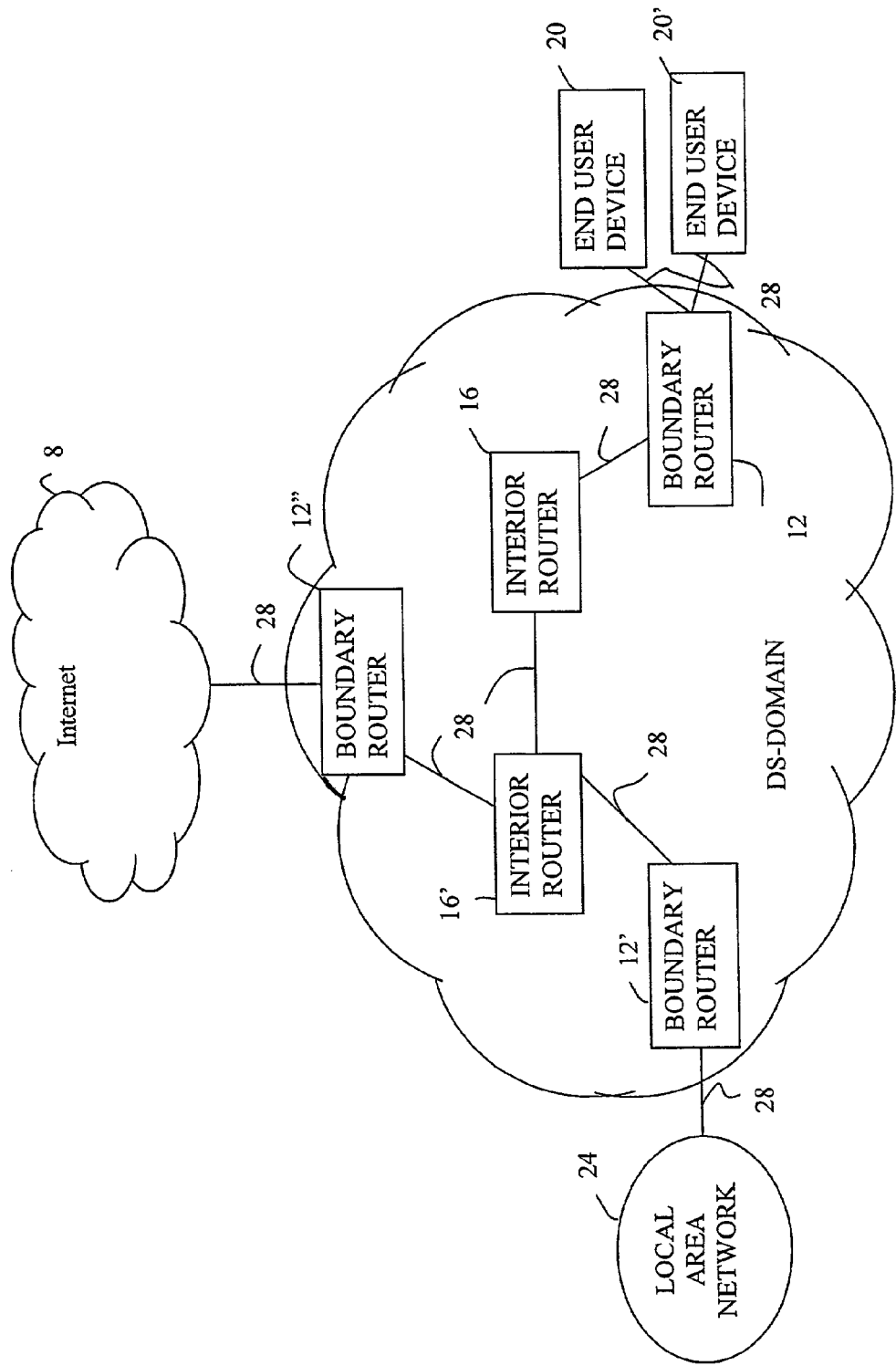
FIG. 1 is a block diagram of an embodiment of a differentiated services (DS) domain, including a plurality of DS-routing nodes, in communication with the Internet.

FIG. 1 shows an embodiment of a differentiated services ("DS") domain 4 (hereafter, DS-domain) in communication with a global network of networks 8 (i.e., the Internet). In general, a DS-domain is a contiguous set of DS-compliant nodes that operate according to a common set of service provisioning policies and per-hop behavior definitions. Per-hop behavior or "PHB" is the forwarding behavior applied at each DS-compliant node to a DS behavior aggregate, i.e., a collection of packets that are aggregated based on similar transmission characteristics, such as delay constraints, sensitivity to loss, and degree of traffic burstiness. DS-compliant nodes are capable of implementing differentiated services in accordance with the policies and PHB definitions.

Referring to FIG. 1, the DS-domain 4 includes DS-compliant boundary (or edge) router nodes 12, 12', 12" (generally, DS-boundary routers 12) and DS-compliant interior (or core) router nodes 16, 16' (generally, DS-interior routers 16). DS-boundary routers, in general, connect a DS-domain to end-user devices, such as laptop computers, personal digital assistants, cellular telephones, and to other networks, such as WANs (wide-area networks), LANs (local area networks), and the Internet. Such end-users and other networks may or may not be DS-capable. DS-boundary routers handle packet traffic that enters and leaves the DS-domain. DS-interior routers are those router nodes within a DS-domain that are not DS-boundary routers, and route packet traffic passing to and from the DS-boundary routers through the interior of the DS-domain.

In FIG. 1, the DS-boundary router 12 is in communication with end users 20 and 20' (generally 20), the DS-boundary router 12' is in communication with a LAN 24, and the DS-boundary router 12" is in communication with the Internet 8. The DS-interior router 16 is in communication with DS-boundary router 12 and a DS-interior router 16'. The DS-interior router 16' is also in communication with the DS-boundary routers 12' and 12".

The DS-boundary and DS-interior routers 12, 16 forward packet traffic through the DS-domain 4 to other DS-routers 12, 16, end-users 20, and networks 8, 24 over communication links 28. These communication links 28 can be wired or wireless. Examples of wireless communication links include microwave links, radio frequency (RF) links, infrared (IR) links, and satellite links. In principle, the DS-domain 4 is referred to as a wireless network because of the presence of wireless devices, although some entities within the DS-domain 4 can be connected by wire-line links.

Each communication link 28 is capable of supporting a certain amount of packet traffic (referred to hereafter as a channel bandwidth), although in practice the full channel bandwidth may not be available for use. Because of wireless links in the DS-domain 4, those wireless DS-routers 12, 16 and end user devices 20 can be mobile and can be subject to varying propagation conditions. This mobility, when it occurs, can affect the channel bandwidth that is actually available over a link 28, as wireless DS-nodes 12, 16 and end user devices 20 move in and out of range of each other, breaking connections with one node or device and establishing connections with another. Wired DS-routers 12, 16 and end user devices 20 are less likely to move within the DS-domain 4 than their wireless counterparts, but can still affect the actual available channel bandwidth when added to or removed from the DS-domain 4 or when turned on and off. Radio propagation peculiarities over wireless links also contribute to the long-term and short-term fluctuations in available bandwidth.

Accordingly, a basic problem faced in wireless networks is that the available service rates at the DS-boundary and DS-interior routers 12, 16 vary highly over time. The invention provides a per-hop behavior (PHB) that takes into account this variability and observes changing available bandwidth (for example, in terms of percentiles) based on real-time measurements. In accordance with the principles of the invention, this PHB enables the offering of quality of service (QoS) assurances for packet traffic in a multi-hop wireless network that experiences dynamic changes to the actual available bandwidth because of router node and end-user device mobility. Although suited for mobile ad hoc wireless networks, the PHB of the invention can also operate in a wired network or networks having a mixture of wired and wireless nodes.

To provide these QoS assurances, the PHB defines a number of classes (or service classes). Each service class represents the requirements of a behavior aggregate and can be specified based on delay constraints, sensitivity to packet loss, and/or degree of business of incoming traffic. Some examples of service classes are:

A first service class is for very low-delay, bounded loss treatment. This treatment allows configuration of services that are delay and jitter sensitive such as voice and video. The parameters for low delay and loss bounds are determined based on characteristics of specific networks and service needs. The source of the traffic uses some form of admission control and a DS-domain boundary router at the DS-domain interface employs traffic control to support this treatment.

A second service class is for very low-loss, bounded delay treatment. This treatment allows configuration of services that are loss-sensitive but can tolerate delays within some bounds, such as file transfer and email. The parameters for tolerable loss and bounds for delays are determined based on characteristics of specific networks and the service needs.

Each packet receives a particular forwarding treatment at each DS-router 12, 16, in accordance with the service class to which it belongs, resulting in a form of QoS assurance.

Packet traffic is policed at the edge of the DS-domain 4 and is controlled at the edge based on congestion feedback. DS-boundary routers 12 include a classifier, which classifies packets according to a DS-codepoint. A DS-codepoint is a specific value inserted into a DS-field in a packet header that identifies the PHB to be practiced on the packet. DS-compliant nodes examine the packets to determine whether to apply PHB. For IPv4, the codepoint is in the TOS (Type of Service) byte. In IPv6, the codepoint is in the Traffic Class byte.

The DS-boundary routers 12 also include a meter that checks packet flow properties against traffic profiles for a given user, a marker that sets and resets the DS-codepoint according to a user's request, and a shaper and a packet dropper that conform the packet flow to the user's profile. DS-interior routers 16 also forward and possibly mark packets.

In one embodiment, each DS-router 12, 16 has a single FIFO (first in, first out) queue for each service class. For each service class, the FIFO queue for that class is configured with a maximum queue length that limits the per-hop queuing delay. If the queue for a given service class is full upon the arrival of new packet for that class, the DS-router 12, 16 discards the new packet.

Delay per-hop is limited to dropping packets, e.g., based on queue size. Different classes can have different per-hop delay requirements. For large delay constraints, the packet dropping can be gradual using a technique like Random Early Drop (RED) described by S. Floyd and V. Jacobson in "Random Early Detection Gateways for Congestion Avoidance," IEEE/ACM Transactions on Networking, Vol. 1, No. 4 pp. 397–413, August 1993.

In brief overview, the PHB of the invention provides expedited service (i.e., no queuing of packets) with high probability during normal communication-link conditions and with decreasing probability during periods when communication-link conditions deteriorate. This is accomplished by allowing variation in the configured nominal departure rate allocation and allowing queues to compensate for changes in the actual available bandwidth. The available bandwidth can be subdivided for reservations, priority-based allocations, and best-effort handling as a back up.

More specifically, the DS-routers 12, 16 allocate a nominal departure rate to each class based on an anticipated behavior of the outgoing communication link 28 (i.e., out from the DS-routers 12, 16). The anticipated behavior (or "nominal bandwidth") can be the same as or less than the full channel bandwidth capability of the communication link 28. A nominal departure rate for each class is the rate (e.g., in packets per second (pkts/sec)) at which a given DS-router 12, 16, under normal link conditions, transmits packets for that class over the link 28. That is, under normal link conditions, each class is provided its allocated nominal departure rate. When packets of a given service class are forwarded at its allocated nominal departure rate, such packets do not build up in its queue.

In one embodiment, the allocation of nominal departure rates is specified in terms of a percentage of the nominal bandwidth. For example, consider that the nominal bandwidth of a given outgoing link 28 of a given DS-router 12 is 100K pkts/sec, and that the DS-domain 4 supports three service classes: service classes A, B, and C. The DS-router 12 can allocate nominal departure rates of 60% of the nominal bandwidth (60K pkts/sec) to service class A, 30% (30K pkts/sec) to service class B, and 10% (10K pkts/sec) to service class C.

DS-routers 12, 16 with more than one outgoing link such as DS-interior router 16', allocate a nominal departure rate for each class for each outgoing link. The nominal departure rate allocated to a given class can differ or be the same for each outgoing link. For example, adding a second outgoing link to the previous example, the nominal departure rate allocated to packets of class A can be 60% on both outgoing links or 60% on one outgoing link and a different percentage such as 20% on the other. For example, where the outgoing links have the same nominal bandwidth (e.g., 100K pkts/sec), the nominal departure rate for both outgoing links is 60K pkts/sec when the percentage allocations are both 60%, or 60K pkts/sec and 20K pkts/sec when the percentage allocations are 60% and 20. Where the outgoing links have different nominal bandwidths (e.g., 100K pkts/sec for a first outgoing link and 300K pkts/sec for a second outgoing link), then allocating the same nominal departure rate percentage of 60% to both outgoing links produces different nominal departure rates (60K pkts/sec and 180K pkts/sec for the first and second links, respectively). Whereas allocating different nominal departure rate percentages (e.g., 60% and 20% to the first and second links, respectively) produces the same nominal departure rate of 60K pkts/sec for each outgoing link.

The nominal departure rate for each class is expected to hold with high probability under good network conditions. The short-term rate of transmitted traffic is limited to its configured nominal departure rate, e.g., using token buckets or exponential moving averages of local traffic rates. This limit is enforced even if no other classes have packets waiting in the queues to be transmitted, because the additional traffic could cause congestion downstream.

The PHB of the invention assigns a rate priority to each class (e.g., by assigning a value to each class). Different classes can have different configured rate priorities. In general, a higher rate priority for a given class indicates that that class experiences less percent degradation compared to other classes when the available bandwidth decreases from the nominal bandwidth. For example, if class A has a higher rate priority than class B, then any loss in actual bandwidth impacts class B traffic before class A traffic. Also, if the total bandwidth provided to all classes is reduced because of resource reduction, then the actual rate provided to class A is reduced from its nominal departure rate by a smaller percentage than the actual rate provided to class B.

Rate priorities correspond to the likelihood and degree that the bandwidth actually provided to a given class will be relatively reduced if resources are reduced or lost. The PHB of the invention implements the rate priorities assigned to the classes by allocating a percentage of the actual available bandwidth (hereafter, a rate priority percentage) to each of the service classes. Classes with higher rate priorities receive a higher rate priority percentage of the available bandwidth than classes with lower rate priorities. These allocated rate priority percentages assure each class a minimum percentage of the actual available bandwidth if the actual available bandwidth degrades from the nominal bandwidth. Accordingly, under favorable operating conditions, each class receives its allocated nominal departure rate. If network resources fall below conditions that can support the nominal departure rate of every class, each class can receive less than its nominal departure rate, but always greater than or equal to its allocated rate priority percentage of the actual available bandwidth.

The rate priority assigned to each class allows determination of an actual available rate for that class as a function of the rate priorities of other classes and their respective nominal departure rate allocations. Thus, the classes operate interdependently. As the total available bandwidth fluctuates with time, the actual bandwidth allocations to the classes depend on the rate priorities and nominal departure rate allocations in a manner described below.

Each configured rate priority indicates the maximum degree to which any degradation in the bandwidth affects the traffic for a given class. For example, a class with a 45% allocated rate priority percentage means that, at worst case, the class receives 45% of the actual available bandwidth of the link, however low the available bandwidth of the link becomes. In contrast, a class with a 0% allocated rate priority percentage can end up with no allocated bandwidth (worst case). Also, any class with an allocated rate priority percentage of 0% has substantially a greater likelihood of losing bandwidth (from its allocated nominal departure rate) than a class with a higher allocated rate priority percentage upon any degradation of the actual available bandwidth.

Rate priorities differ from conventional scheduling priorities that give one class a higher priority than another class via priority queuing. Scheduling priorities indicate which class should be selected among all classes that have queued packets and that do not violate the rate limiting mechanism (e.g., token bucket). For example, classes can be prioritized from a scheduling point of view based on their delay criteria. In contrast, rate priorities determine which class should be selected among all classes that have queued packets based in general upon whether the classes are receiving at least their minimum allocated share of the available bandwidth and at most their allocated nominal departure rate.

EXAMPLE

CBQ-AR (Class Based Queuing with Adaptive Rate)

As an example, suppose that classes A, B and C have allocated nominal departure rates of 25%, 50%, and 25%, respectively, and class A has a higher scheduling priority than class B, and class B has a higher scheduling priority than class C. An allocation of rate priority percentages of 50%, 50% and 0% to classes A, B, and C, respectively, illustrates that the rate priority percentages need not be proportional to the nominal departure rate allocations.

In this example, class A, which has the highest rate priority, is guaranteed its allocated nominal departure rate even if the actual available bandwidth drops by 50% (because class A is guaranteed 50% of the actual available bandwidth). If the available bandwidth drops to 75% of the nominal bandwidth, then classes A and B still receive their allocated nominal departure rates, but class C is not guaranteed any bandwidth. (Class C can have some throughput if classes A and B do not require their full, allocated rates). If the available bandwidth drops to less than 50% of the nominal bandwidth, classes A and B equally share the available bandwidth. Thus, the amount of bandwidth that is guaranteed to each class is a function of the available bandwidth.

The absolute allocations (i.e., nominal departure rate allocations and allocated rate priority percentages together) can be different for different outgoing links if the links are of different types (for example as in the case of use of software defined radios with simultaneous multiple waveforms). The absolute allocations can also be different at different DS-routers 12, 16 if the DS-routers 12, 16 are not homogeneous (as in the case of a network with a mix of different radios with different rate capabilities). In such a heterogeneous environment, local congestion can develop because of the rate dissimilarity among hops. The individual allocations at each DS-router 12, 16 can take into consideration such heterogeneity to reduce the burstiness in traffic patterns and adequate buffers to smooth out the short-term fluctuations. In a homogenous environment, the allocations can be based on the total available bandwidth in the DS-domain 4 instead of on a per link basis.

The PHB of the invention is achievable using one of a variety of processes for scheduling and/or routing. In accordance with the PHB, the DS-routers 12, 16 dynamically adjust the bandwidth allocations in response to changes in available bandwidth, in accordance with different rate priorities assigned to different service classes. Rate priorities are also achievable by way of alternate routing, for example, by providing alternate routing only to the class with the highest rate priority when a link fails.

Figure 2:
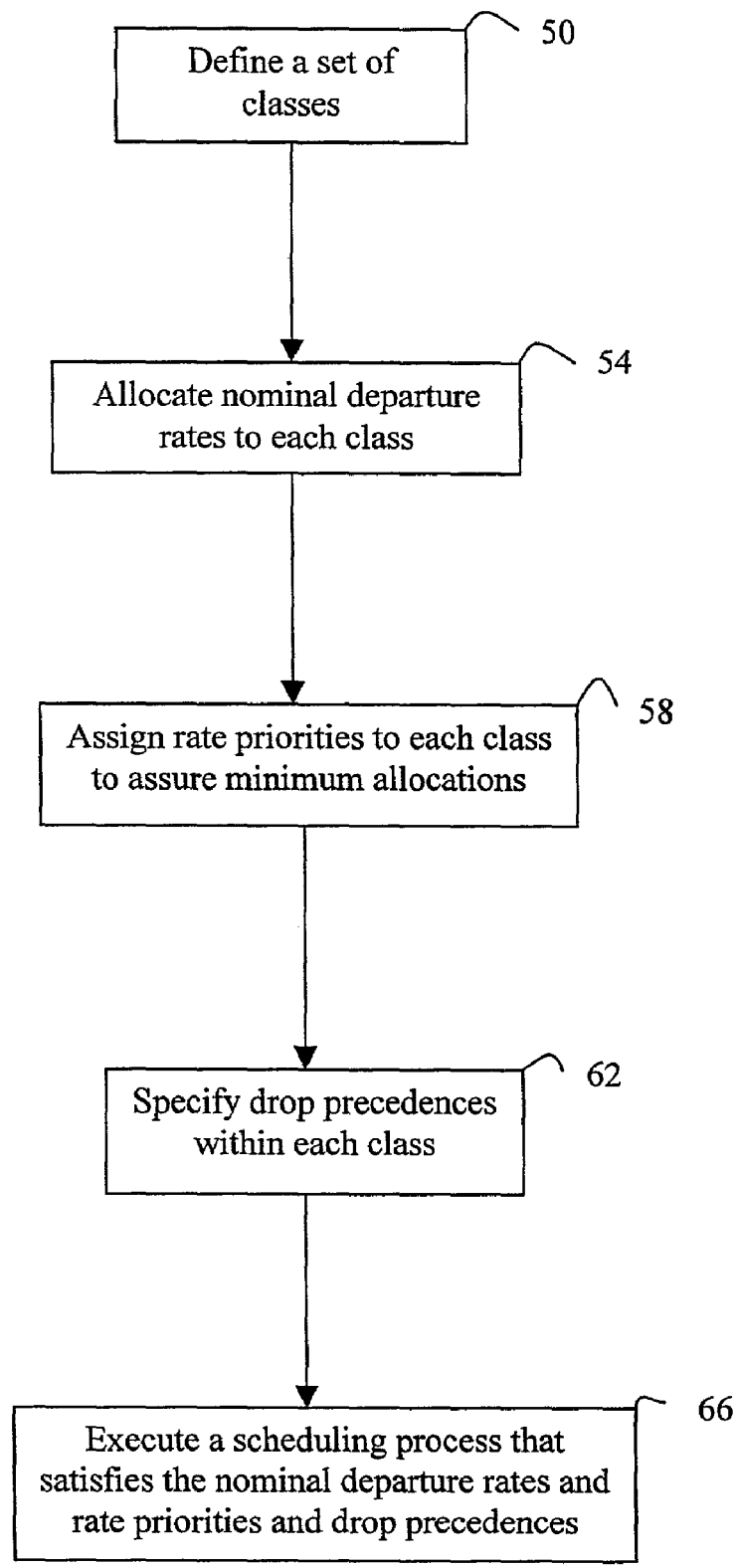
FIG. 2 is flow diagram illustrating an embodiment of a process employed by the DS-router nodes in the DS domain for providing quality of service (QoS) assurances to packet traffic aggregated into service classes.

FIG. 2 shows an embodiment of the PHB performed by the DS-boundary and DS-interior routers 12, 16 in the DS domain 4 for providing QoS assurances to different classes of packets. (The order of the steps is exemplary.) In step 50, the set of classes is defined. The PHB of the invention allocates (step 54) a nominal departure rate to each class based on the nominal bandwidth of an outgoing communication link 28 and assigns (step 58) a rate priority to each class.

Each DS-router 12, 16 also specifies (step 62) a drop precedence for each class of packets. Precedence values are defined for packet dropping within each service class to assure better treatment for more important traffic. Accordingly, within each class, there is a drop precedence hierarchy, i.e., highest drop precedence category to be dropped first and so on. Military priority classes, for example, can be aggregated if necessary in creating such precedence categories. If congested, a given DS router 12, 16 preferably discards packets with higher drop precedence values to protect packets with lower drop precedence values from being lost. Each DS-router 12, 16 executes (step 66) a scheduling process (or mechanism) that satisfies the nominal departure rates and rate priority percentages allocated to each service class and the precedence values assigned to packets within the classes.

Scheduling Mechanisms to Attain PHB

Figure 3:
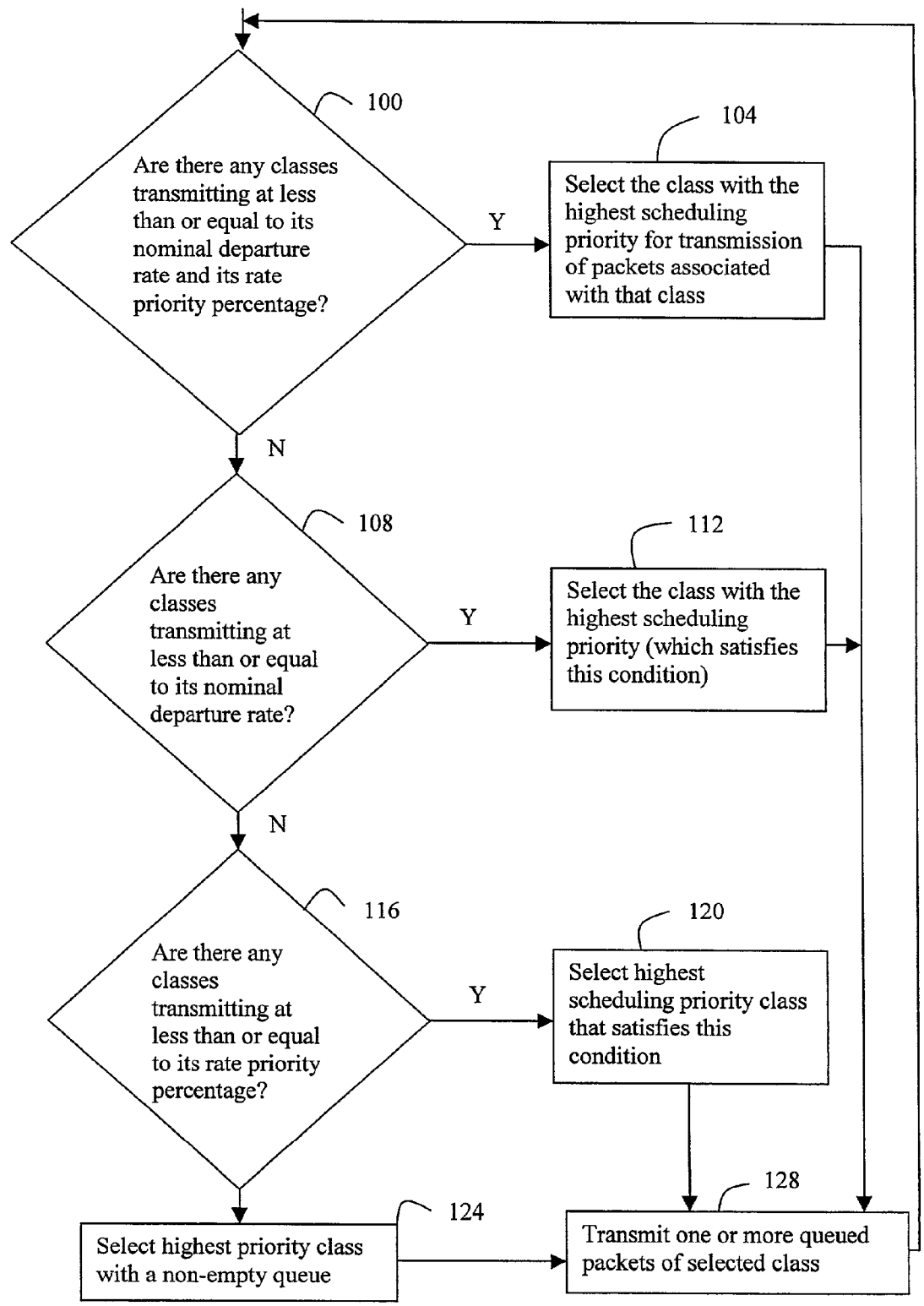
FIG. 3 is a flow diagram illustrating an embodiment of a scheduling mechanism by which a routing node in the DS domain selects a class of packets for forwarding such packets towards their destination in accordance with the principles of the invention.

FIG. 3 shows an embodiment of a scheduling process used by a DS-router 12, 16 for scheduling transmission of packets stored within the queues of that router node. This process, referred to as CBQ-AR (class-based queuing with adaptive rate), imposes two conditions on the rate of transmission of packets. A first condition controls the nominal departure rate allocated to each class. The other condition ensures that each service class is guaranteed at least its allocated rate priority percentage of the actual available bandwidth (as long as this rate priority percentage does not exceed the nominal departure rate).

The nominal departure rate of each class (k) is denoted $R_k$ and the allocated rate priority percentage is denoted $P_k$. For simplifying the description of the process, each data packet is assumed to have the same length so that transmission rates can be expressed in pkts/sec. The principles of the invention can extend to packets of variable length.

For each class k, an exponential moving average denoted $S_k$ is maintained that represents the average rate (pkts/sec) at which class k has been served over the last T seconds. T represents the time interval over which the allocated rates are enforced. For example, if T is chosen to be 60 seconds, then a class k that has been idle for 30 seconds can compensate by using twice its allocated rate for the next 30 seconds. This may or may not be desirable. In one embodiment, T is 5 seconds. A conventional token bucket can be used to attain the allocated rates.

The CBQ-AR process uses the following two inequalities, which correspond to the two conditions described above, to determine a current exponential moving average, $S_k$, for each class k:

$S_k \leq R_k$      Condition 1

$S_k \leq P_k * \Sigma S_i$      Condition 2 where the sum is over all classes i. The first condition enforces the nominal departure rates, and the second condition enforces the rate priority percentage allocations. The sum of $S_i$ is an estimate of the actual available bandwidth of the channel. Other estimates can be used without departing from the principles of the invention.

Satisfying the first condition means that packets of a given class have been transmitted at an average rate over time T that is less than or equal to the nominal departure rate of that class. Satisfying the second condition means that packets of a given class have been transmitted at an average rate over time T that is less than or equal to its allocated rate priority percentage.

Referring to FIG. 3, the CBQ-AR process based on these two conditions seeks classes that are receiving less than its allocated nominal departure rate and its allocated rate priority percentage. Accordingly, the process identifies (step 100) each service class with a non-empty queue that satisfies both conditions. Of the identified classes, the DS-router 12, 16 selects (step 104) the service class with the highest scheduling priority (for example, class A can be given a higher scheduling priority than class B, class D a higher class than class C, etc. Other factors being equal, the scheduling priority decides which class is allowed to transmit the next packet). The DS-router 12, 16 transmits (step 128) queued packets of the selected class over the corresponding outgoing link.

If no service class with a non-empty queue satisfies both conditions, then the DS-router 12, 16 identifies (step 108) each service class that satisfies the first condition (i.e., Condition 1) and selects (step 112) the highest scheduling priority class of those classes identified. The DS-router 12, 16 then transmits (step 128) queued packets of the selected class over the corresponding outgoing link.

If no service class with a non-empty queue satisfies the first condition, then the DS-router 12, 16 identifies (step 116) each class that satisfies the second condition (e.g., Condition 2) and selects (step 120) the highest scheduling priority class of those classes identified. The DS-router 12, 16 then transmits (step 128) queued packets of the selected class over the corresponding outgoing link.

If no service class with a non-empty queue satisfies either the first or the second condition, then the DS-router 12, 16 selects (step 124) the highest scheduling priority class with a non-empty queue.

It is to be understood that various scheduling mechanisms other than CBQ-AR can be employed to forward packets in accordance with the two conditions described above, and thereby support the PHB of the invention, without departing from the principles of the invention.

Simulations were run to compare the performance of the CBQ-AR scheduling mechanism, described above, in its support of the PHB of the invention, with three other scheduling mechanisms: 1) CBQ-PQ (class based queuing with priority queuing), 2) conventional CBQ-WRR (class based queuing with weighted round robin), and 3) best effort forwarding. CBQ-PQ (priority queuing) is CBQ (using Condition 1 above) with strict scheduling priority queuing. CBQ-WRR is CBQ with weighted round robin, where the weights are equal to the nominal departure rates. Best effort treats all classes equally using a single FIFO queue. The CBQ-PQ and CBQ-WRR processes are two mechanisms that support the Expedited Forwarding PHB, described in RFC 2598, V. Jacobson, K. Nichols, and K. Poduri, "An Expedited Forwarding PHB," June 1999. Such CBQ-PQ and conventional CBQ-WRR mechanisms do not consider rate priorities.

The simulations used three classes: Class 1 had a nominal departure rate of 4.5 packet/sec and a rate priority percentage allocation of 50%; Class 2 had a nominal departure rate of 9 packets/sec and a rate priority percentage allocation of 50%; Class 3 had a nominal departure rate of 4.5 packets/sec and a rate priority percentage allocation of 0%. As in the example given above, Class 1 had the highest scheduling priority and Class 3 had the lowest. The maximum queue lengths for Classes 1, 2, and 3 were 10 packets, 100 packets, and 100 packets, respectively. Thus, Class 1 had a more stringent delay requirement than the other classes.

lower delay to Class 1 than CBQ-AR, since the CBQ-PQ mechanism always gives Class 1 highest priority; however, this is accomplished at the cost of not being able to enforce the allocated rate priority percentages.

TABLE 1

Throughput (packets/sec) for the three classes for different channel rates using different scheduling mechanisms

| | CBQ-AR | | | CBQ-PQ | | | CBQ-WRR | | | Best effort | | |
|---|---|---|---|---|---|---|---|---|---|---|---|---|
| Channel rate | Cl 1 | Cl 2 | Cl 3 | Cl 1 | Cl 2 | Cl 3 | Cl 1 | Cl 2 | Cl 3 | Cl 1 | Cl 2 | Cl 3 |
| 625 kbps | 4.00 | 8.70 | 4.28 | 3.77 | 8.40 | 4.30 | 3.17 | 7.30 | 3.58 | 3.95 | 7.90 | 4.02 |
| 500 kbps | 4.33 | 8.37 | 3.37 | 4.22 | 8.32 | 3.25 | 3.58 | 8.70 | 4.37 | 3.13 | 6.72 | 3.08 |
| 375 kbps | 3.73 | 6.12 | 0.23 | 4.35 | 4.90 | 0.00 | 2.48 | 5.72 | 2.85 | 2.80 | 4.88 | 2.53 |
| 250 kbps | 3.33 | 3.25 | 0.00 | 4.38 | 3.28 | 0.00 | 2.07 | 4.12 | 2.07 | 2.23 | 4.25 | 2.03 |
| 125 kbps | 2.58 | 2.13 | 0.00 | 3.90 | 1.23 | 0.00 | 1.35 | 2.72 | 1.35 | 1.47 | 2.28 | 1.20 |

TABLE 2

End-to-end delay (sec) for the three classes for different channel rates using different scheduling mechanisms

| | CBQ-AR | | | CBQ-PQ | | | CBQ-WRR | | | Best effort | | |
|---|---|---|---|---|---|---|---|---|---|---|---|---|
| Channel rate | Cl 1 | Cl 2 | Cl 3 | Cl 1 | Cl 2 | Cl 3 | Cl 1 | Cl 2 | Cl 3 | Cl 1 | Cl 2 | Cl 3 |
| 625 kbps | 0.53 | 1.30 | 2.56 | 0.52 | 1.48 | 2.92 | 0.74 | 1.31 | 1.42 | 1.03 | 1.11 | 1.13 |
| 500 kbps | 0.56 | 1.82 | 14.45 | 0.58 | 1.82 | 12.57 | 1.34 | 5.48 | 14.55 | 2.40 | 2.46 | 2.35 |
| 375 kbps | 1.06 | 9.37 | 25.21 | 0.85 | 9.00 | NA | 1.74 | 8.81 | 14.61 | 5.73 | 5.74 | 5.79 |
| 250 kbps | 1.44 | 11.44 | NA | 0.90 | 9.98 | NA | 2.29 | 11.13 | 23.38 | 5.74 | 5.71 | 5.82 |
| 125 kbps | 2.11 | 11.71 | NA | 1.04 | 11.28 | NA | 2.67 | 12.25 | 21.08 | 5.91 | 5.99 | 6.14 |

In the simulations, three traffic streams, one per class, were generated at the nominal departure rates at a source node. These traffic streams were routed through an intermediate node to a destination node. The OPNET (Optimized Engineering Network Tool) model for wireless CSMA (carrier-sense multiple access) was used. The channel rate (i.e., available bandwidth) of the intermediate node was gradually decreased from 625 kbps to 125 kbps, and the throughput and end-to-end delay for each class was measured at each channel rate level. The results for throughput are given in Table 1, and the results for end-to-end delay are given in Table 2.

At the maximum channel rate of 625 kbps, the throughputs of the three classes were roughly proportional to their nominal departure rates for all mechanisms (some loss due to collisions and buffer overflow occurred). At 375 kbps, with CBQ-AR, Class 3's throughput dropped to nearly zero, Class 2's throughput dropped significantly, and Class 1's throughput dropped slightly. The same was observed for CBQ-PQ. CBQ-WRR and best effort always maintained the ratio 1:2:1 for the three classes, which does not attain the PHB of the invention. At 125 kbps, it becomes clear that CBQ-AR supports the PHB of the invention, but CBQ-PQ does not, since with CBQ-AR Classes 1 and 2 receive roughly the same throughput (in accordance with the rate priority percentage allocations), but with CBQ-PQ Class 1 receives much more throughput than Class 2. These simulation results clearly show the need for the PHB of the invention to achieve QoS assurances, and that CBQ-AR is one mechanism to attain it.

Table 2 shows that CBQ-AR and CBQ-PQ both give Class 1 much lower delays than Classes 2 and 3, but the delays for Class 1 are significantly higher with CBQ-WRR and best effort. It is expected that CBQ-PQ would give a CBQ with Weighted Round-Robin (WRR)

Another embodiment of a scheduling mechanism that attains the PHB of the invention by forwarding packets in accordance with the two conditions described above is class-based queuing with weighted round-robin (CBQ-WRR). CBQ-WRR mechanism achieves a similar reduction (to the CBQ-AR mechanism) in the nominal departure rates of the classes as the available bandwidth decreases.

This CBQ-WRR mechanism uses CBQ to limit the departure rates $S_k$ (averaged over a period of time) according to the allocated nominal departure rates $R_k$ (i.e., to enforce Condition 1 above). The CBQ-WRR mechanism also uses weighted round-robin (WRR) scheduling, where the weights are equal to the rate priority percentages allocated to the classes, to enforce the allocated rate priority percentages $P_k$ among the classes k that satisfy Condition 1.

As with the CBQ-AR mechanism described above, the departure rate $S_k$ for each class k is equal to $R_k$ as long as the available bandwidth is at the full nominal value. At nominal bandwidth, the WRR scheduling can affect the order in which packets depart, but does not affect the average departure rates $S_k$. As the available bandwidth is reduced sufficiently, the nominal departure rates $R_k$ can no longer be supported for all classes k, and the average nominal departure rates $S_k$ decrease as a function of the nominal departure rates $R_k$, the allocated rate priority percentages $P_k$, and the available bandwidth S. In the case where the available bandwidth S approaches zero, the actual departure rates will become proportional to the allocated rate priority percentages $P_k$.

Figure 4:
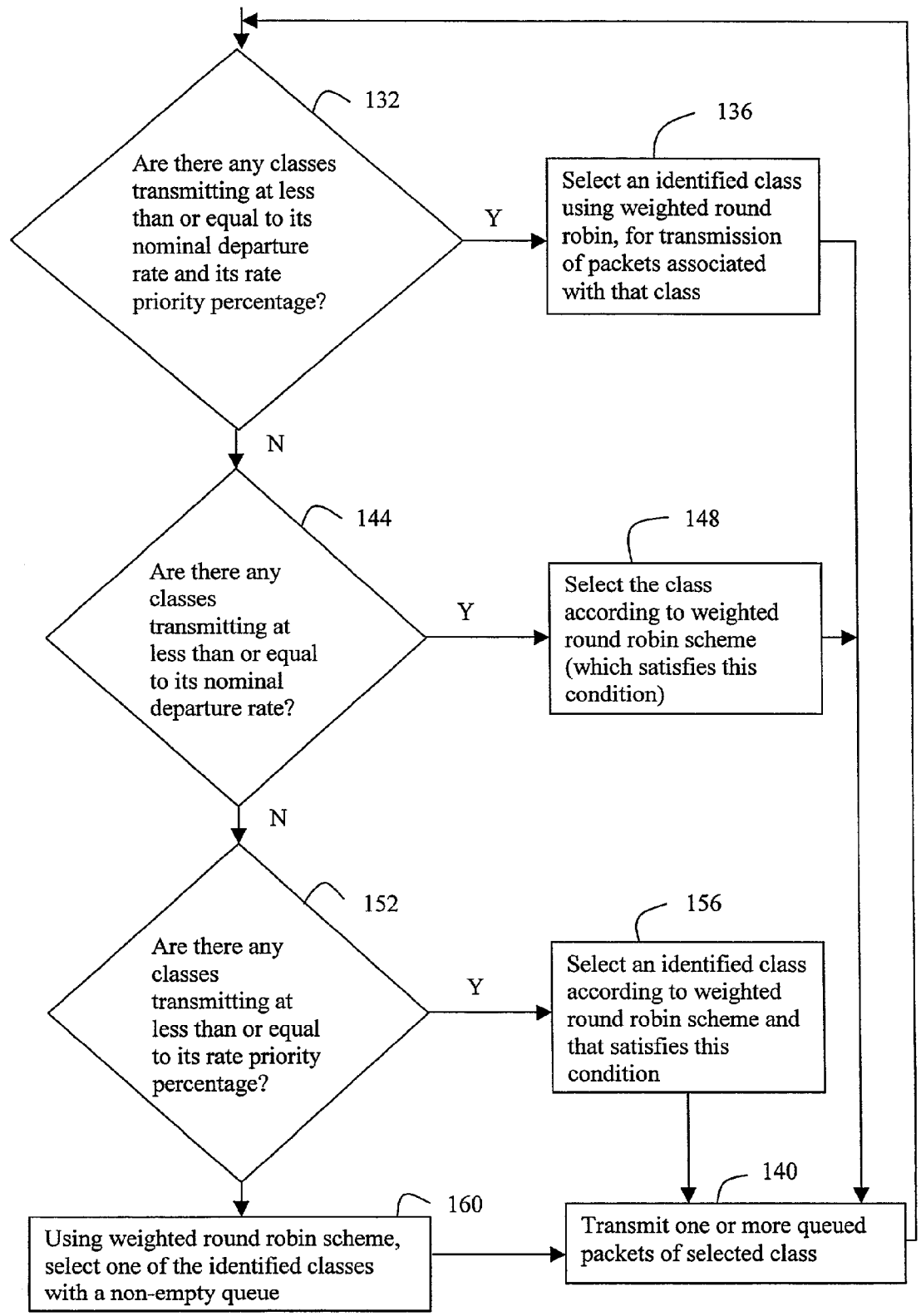
FIG. 4 is a flow diagram illustrating an embodiment of another scheduling mechanism by which a routing node in the DS domain selects a class of packets for forwarding such packets towards their destination in accordance with the principles of the invention.

Referring to FIG. 4, one embodiment of the CBQ-WRR process of the invention identifies (step 132) each service class with a non-empty queue that is receiving less than its allocated nominal departure rate and its allocated rate priority percentage of the available bandwidth over a time interval T. The DS-router 12, 16 selects (step 136) one of the identified service classes based on the weights assigned to each class and the current place in the round robin order. The DS-router 12, 16 transmits (step 140) one or more queued packets of the selected class over the corresponding outgoing link.

If no service class with a non-empty queue satisfies both conditions, then the DS-router 12, 16 identifies (step 144) each service class that satisfies the first condition (i.e., Condition 1). The DS-router 12, 16 then selects (step 148) one of the identified service classes as determined by the weighted round robin order. The DS-router 12, 16 then transmits (step 140) one or more queued packets of the selected class over the corresponding outgoing link.

If every service class with a non-empty queue is receiving more than its allocated nominal departure rate over the time interval T (i.e., no such class satisfies Condition 1), then the DS-router 12, 16 identifies (step 152) each class that satisfies the second condition (e.g., Condition 2). The DS-router 12, 16 selects (step 156) one of the identified service classes as determined by the weighted round robin order and transmits (step 140) one or more queued packets of the selected class over the corresponding outgoing link.

If every service class with a non-empty queue over time interval T is receiving more than its allocated nominal departure rate and more than its allocated percentage of available bandwidth (i.e., no such service class satisfies either the first or the second condition), then the DS-router 12, 16 selects (step 160) one of such service classes as determined by the weighted round robin order and transmits (step 140) one or more queued packets of the selected class over the corresponding outgoing link.

An example of how the departure rates $S_k$ decrease as the available bandwidth drops is described below.

Example for the CBQ-WRR Mechanism:

Consider an exemplary embodiment of the DS-domain 4 in which there are four defined classes of services, A, B, C, and D, with nominal departure rates and rate priority percentages allocated to these classes at a given DS-router 12, 16 as shown in Table 3 below. As described above, other DS-routers 12, 16 can be allocated different nominal departure rates and rate priority percentages than those shown in Table 3. For the purpose of this example, assume that each service class uses the full bandwidth allocable to it. Further, assume that the nominal bandwidth under good link conditions is 100 K pkts/sec (a bandwidth value arbitrarily selected to simplify the arithmetic).

TABLE 3

| Service Class | Nominal Departure Rate | Rate Priority Percentage |
|---|---|---|
| A | 10% | 60% |
| B | 30% | 0% |
| C | 50% | 30% |
| D | 10% | 10% |

As shown by the example in Table 3, the rate priority percentages allocated to the service classes are not proportional to the nominal departure rates allocated to these classes.

Table 4 below shows an example of an actual allocation of bandwidth to each of the service classes A, B, C, and D in accordance with the CBQ-WRR mechanism described above employed by the DS-router 12, 16 at various levels of actual available bandwidth.

TABLE 4

| Actual Available Bandwidth (K pkts/sec) | Bandwidth Allocated to Each Service Class (K pkts/sec) | | | |
|---|---|---|---|---|
| | Service Class A | Service Class B | Service Class C | Service Class D |
| 100 (nominal) | 10 | 30 | 50 | 10 |
| 90 (10% drop) | 10 | 20 | 50 | 10 |
| 80 (20% drop) | 10 | 10 | 50 | 10 |
| 70 (30% drop) | 10 | 0 | 50 | 10 |
| 60 (40% drop) | 10 | 0 | 40 | 10 |
| 50 (50% drop) | 10 | 0 | 30 | 10 |
| 40 (60% drop) | 10 | 0 | 22.5 | 7.5 |
| 30 (70% drop) | 10 | 0 | 15 | 5 |
| 20 (80% drop) | 10 | 0 | 7.5 | 2.5 |
| 10 (90% drop) | 6 | 0 | 3 | 1 |

Because the CBQ-WRR mechanism uses weighted round robin scheduling, it enforces the allocated rate priority percentages on a very short-term basis, unlike the CBQ-AR mechanism, which enforces the allocated rate priority percentages over some time interval that can be selected. Also, since the CBQ-WRR mechanism uses WRR scheduling, it does not support class priorities. Therefore, the CBQ-AR mechanism is preferred if it is desirable to give some classes higher priority, e.g., to achieve lower delay.

Dropping Packets

Fluctuations in wireless network behavior produce long term and short term implications on network congestion. In general, congestion problems are handled by dropping packets. To smoothen the process of dropping packets, one embodiment uses configurable dual threshold congestion levels (e.g., Random Early drop). A suitable parameter is chosen to indicate the congestion level that is specifiable, configurable, and measurable. Whenever the instantaneous value of the parameter, which for example can be a moving average derived from a selected window size, is below the lower threshold, no dropping of packets occurs. If the value lies between the lower and upper thresholds, the dropping probability for that relevant precedence increases, ranging from zero to a specified percent in a graded manner as the upper threshold is approached. When the value reaches above the second (upper) threshold, packets of that relevant precedence are dropped with certainty.

In accordance with the principles of the invention, the PHB performed by the DS-boundary and DS-interior routers 12, 16 extends such packet dropping for short term congestion as well (i.e., the DS-routers 12, 16 make no distinction between long term and short term congestion). Dropping packets under short-term congestion prevents excessive build up of packets within the queues and meets delay constraints. For low delay constraints (with small queue sizes), another mechanism for dropping packets can be adopted (for queue sizes below a threshold) instead of the dual threshold mechanism. In this case, a configurable single threshold, such as the queue size, is defined. Whenever the value of the parameter exceeds the threshold, packets are dropped within the class according to the drop precedence hierarchy, i.e., highest drop precedence category to be dropped first and so on. To ensure that the packet-dropping process is fair to multiple micro-flows within a drop precedence category, a randomized dropping criterion can be used (instead of first-in-first-out) when multiple packets exist within that drop precedence category. Such a randomized dropping process smoothens the drops across multiple flows whose packets can arrive in short term bursts.

Additional aspects of the PHB of the invention follow below:

Rate Degradation

When the nominal departure rate allocations cannot be achieved on an average basis over a prolonged time interval, in one embodiment, the DS-routers 12, 16 define progressively decreasing nominal departure rate allocations for the service classes. This takes into account whether some packet streams can tolerate any gradual degradation, which is determined by rate priority.

Preemption.

When a lower drop precedence packet arrives during the transmission period of a packet belonging to a higher drop precedence category, in one embodiment, the ongoing transmission of the latter packet is be preempted in favor of the newly arrived packet.

PHB Performance Feedback and Adjustments.

In view of highly dynamic nature of wireless link characteristics, adaptation of the PHB either through invocation of new PHB features or parameterization of existing features can be considered based on the feedback from the network. For example, the DS-routers 12, 16 can modify the nominal departure rate or rate priority percentages allocated to the classes.

Security Considerations.

To prevent denial of service attacks, the DS-routers 12, 16 avoid allocating all of the router and network resources to one class. By allocating minimum nominal resources to each class, a reduced level of service can be maintained even if attacks occur on one or more classes.

Ad-Hoc Network PHB and Interactions Between DS Domains

In one embodiment, the DS-routers 12, 16 support a default PHB, which is the best-effort forwarding. Under the default PHB, the routers 12, 16 reserve resources, such as buffers and queues, to provide a minimal level of service for traffic that is not DS-compliant. Supporting the default PHB enables the coexistence of DS-compliant and non-DS-compliant traffic, which can be important during any transition period within the DS-domain 4.

Accordingly, codepoints assigned to the PHB of the invention do not interfere with the Class Selector Codepoints for backward compatibility with IPv4 TOS (Type of Service) and IPv6 Traffic classes. Also, the default PHB codepoint of '000000' can remain available for conventional best effort treatment for non-DS-compliant traffic. Also, any other PHB groups, such as EF PHB (Expedited Forwarding PHB) and AF PHB (Assured Forwarding PHB) can coexist with the PHB of the invention. Excess resources and used resources can be reallocated within the PHB of the invention and among other PHBs and PHB groups that can be present, including the default PHB.

Service Provisioning in Multicast Traffic.

In one embodiment, the PHB of invention is used to provide unicast services exclusively, thus providing resource isolation from multicast services due to the variability and unpredictability of such multicast services.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPOM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for attaining a per-hop behavior for a plurality of classes of packet traffic in a multi-hop network, the per-hap behavior allocating to each class a nominal departure rate and a minimum percentage of available bandwidth, comprising: defining a first condition that affects packet forwarding in accordance with the nominal departure rates allocated to the classes; defining a second condition that affects packet forwarding in accordance with the minimum percentages of the available bandwidth allocated to the classes; comparing a packet forwarding rate for each of the classes with the first and second conditions to select one of the classes for forwarding packets of that class over the network; and determining an average packet forwarding rate for each class over a time interval having a predetermined duration of approximately 5 seconds.

2. The method of claim 1 wherein the first condition is whether the packet forwarding rate of each class is at most the nominal departure rate of that class.

3. The method of claim 1 wherein the second condition is whether the packet forwarding rate of a given class is at most the minimum percentage of the available bandwidth of that class.

4. The method of claim 1 further comprising assigning a scheduling priority to each class based on a criterion.

5. The method of claim 4 wherein the criterion is a delay that each class can tolerate.

6. The method of claim 4 further comprising identifying a plurality of the classes from which to select a class for packet forwarding, and selecting the class with the highest scheduling priority from the identified plurality of classes.

7. The method of claim 1 further comprising assigning a weight to each of the classes that corresponds to the minimum percentage of the available bandwidth allocated to each class.

8. The method of claim 7 further comprising identifying a plurality of the classes from which to select a class for packet forwarding, and selecting one of the identified classes based on an order determined by the weights assigned to the identified classes.

9. The method of claim 8 wherein the order is a weighted round robin order.

10. A method for attaining a per-hop behavior for a plurality of classes of packet traffic in a multi-hop network, the per-hop behavior allocating to each class a nominal departure rate and a minimum percentage of available bandwidth, comprising: identifying each class with a non-empty queue that over a time interval is receiving less than the nominal departure rate and less than the minimum percentage of available bandwidth allocated to that class; and selecting one of the identified classes according to a predefined criterion, for forwarding a packet of the selected class over the network; and if each class with a non-empty queue is receiving more than the nominal departure rate and more than the rate priority percentage allocated to that class over the time interval, selecting a class with a non-empty queue that has the highest scheduling priority for transmitting a packet of the selected class.

11. The method of claim 10 further comprising weighting each of the classes with a weight that corresponds to the minimum percentage of available bandwidth allocated to that class, and wherein the predefined criterion is to use a weighted round robin order to select one of the identified classes for forwarding a packet of that class.

12. The method of claim 10 further comprising assigning a scheduling priority to each class, and wherein the predefined criterion is to select a class with the highest scheduling priority of the identified classes for forwarding a packet of that class.

13. The method of claim 10 wherein over the time interval each class with a non-empty queue is receiving more than the minimum percentage of the available bandwidth allocated to that class, and further comprising selecting a class with a non-empty queue that has the highest scheduling priority of those classes that are receiving at most the respective allocated nominal departure rate, for forwarding a packet of the selected class.

14. The method of claim 13 wherein over the time interval each class with a non-empty queue is receiving more than the nominal departure rate allocated to that class, and further comprising selecting a class with a non-empty queue that has the highest scheduling priority.

15. The method of claim 10 wherein over the time interval each class with a non-empty queue is receiving more than the nominal departure rate allocated to that class, and further comprising selecting a class with a non-empty queue that has the highest scheduling priority of those classes that are receiving at most the respective allocated minimum percentage of the available bandwidth, for forwarding a packet of the selected class.

16. The method of claim 10 further comprising assigning a scheduling priority to each of the classes based on a criterion.

17. An article of manufacture having computer-readable program means embodied thereon for attaining a per-hop behavior for a plurality of classes of packet traffic in a multi-hop network, the per-hop behavior allocating to each class a nominal departure rate and a minimum percentage of available bandwidth, the article comprising: computer-readable means for defining a first condition that affects packet forwarding in accordance with the nominal departure rates allocated to the classes; computer-readable means for defining a second condition that affects packet forwarding in accordance with the minimum percentages of the available bandwidth allocated to the classes; computer-readable means for comparing a packet forwarding rate for each of the classes with the first and second conditions to select one of the classes for forwarding packets of that class over the network; and computer-readable means for determining an average packet forwarding rate for each class over a time interval having a predetermined duration of approximately 5 seconds.

18. Apparatus for attaining a per-hop behavior for a plurality of classes of packet traffic in a multi-hop network, the per-hop behavior allocating to each class a nominal departure rate and a minimum percentage of available bandwidth, the apparatus comprising: means for defining a first condition that affects packet forwarding in accordance with the nominal departure rates allocated to the classes; means for defining a second condition that affects packet forwarding in accordance with the minimum percentages of the available bandwidth allocated to the classes; means for comparing a packet forwarding rate for each of the classes with the first and second conditions to select one of the classes for forwarding packets of that class over the network; and means for determining an average packet forwarding rate for each class over a time interval having a predetermined duration of approximately 5 seconds.

19. An article of manufacture having computer-readable program means embodied thereon for attaining a per-hop behavior for a plurality of classes of packet traffic in a multi-hop network, the per-hop behavior allocating to each class a nominal departure rate and a minimum percentage of available bandwidth, comprising: computer-readable means for identifying each class with a non-empty queue that over a time interval is receiving less than the nominal departure rate and less than the minimum percentage of available bandwidth allocated to that class; and computer-readable means for selecting one of the identified classes according to a predefined criterion, for forwarding a packet of the selected class over the network; computer-readable means for, if each class with a non-empty queue is receiving more than the nominal departure rate and more than the rate priority percentage allocated to that class over the time interval, selecting a class with a non-empty queue that has the highest scheduling priority for transmitting a packet of the selected class.

20. Apparatus for attaining a per-hop behavior for a plurality of classes of packet traffic in a multi-hop network, the per-hop behavior allocating to each class a nominal departure rate and a minimum percentage of available bandwidth, comprising: means for identifying each class with a non-empty queue that over a time interval is receiving loss than the nominal departure rate and less than the minimum percentage of available bandwidth allocated to that class; means for selecting one of the identified classes according to a predefined criterion, for forwarding a packet of the selected class over the network; and means for, if each class with a non-empty queue is receiving more than the nominal departure rate and more than the rate priority percentage allocated to that class over the time interval, selecting a class with a non-empty queue that has the highest scheduling priority for transmitting a packet of the selected class.

* * * * *